Oct. 23, 1945. V. VON K. SUNDT 2,387,417
LEAD SCREW GEAR THREADING BOX
Filed Dec. 7, 1942 4 Sheets-Sheet 3

Vigo von Krogh Sundt
INVENTOR.
BY
ATTORNEY.

Oct. 23, 1945.  V. VON K. SUNDT  2,387,417
LEAD SCREW GEAR THREADING BOX
Filed Dec. 7, 1942  4 Sheets-Sheet 4
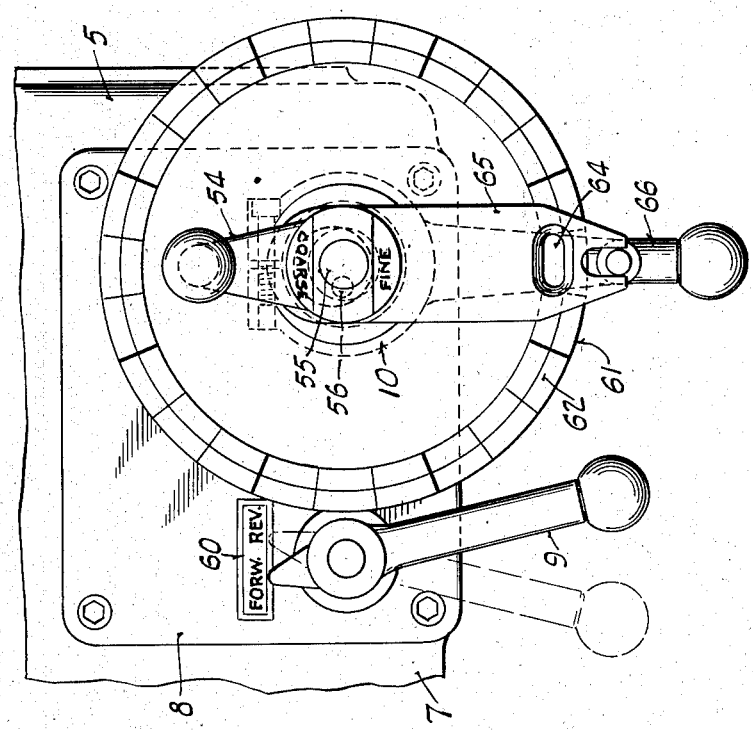
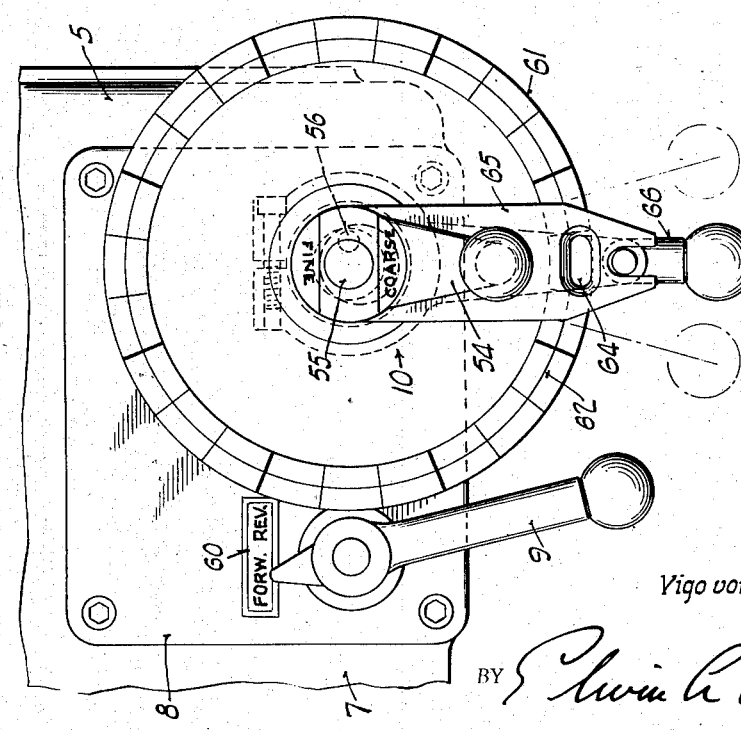
Vigo von Krogh Sundt
INVENTOR.
BY
ATTORNEY.

Patented Oct. 23, 1945

2,387,417

UNITED STATES PATENT OFFICE 2,387,417

LEAD SCREW GEAR THREADING BOX

Vigo von Krogh Sundt, Madison, Wis., assignor to Gisholt Machine Company, Madison, Wis., a corporation of Wisconsin Application December 7, 1942, Serial No. 468,143

7 Claims. (Cl. 116—124)

This invention relates to a lead screw gear threading box for a machine tool such as a lathe and more particularly to a lead screw gear transmission and control mechanism for driving the lead screw at different rates of speed.

One object of the present invention is to provide a lead screw gear threading box with a gear transmission capable of producing a relatively large number of different gear ratios through a simply-operated control mechanism to drive the lead screw at a substantial number of different rates of speed indicated automatically in accordance with the operation of the control mechanism.

Another object is to provide an improved control and gear mechanism in a lead screw gear threading box to obtain better control and more feed rate drives of the several apron carriages of the machine tool to which the improved control and gear mechanism is applied.

A further object is to provide a lead screw gear threading box with an easily-operated selector device and gear control mechanism.

Another object is to provide a selector dial with at least two adjacent sets of readings and in which one set is blocked out when a lever is adjusted for utilizing the other so that the operator is prevented from making a mistake in reading.

Another object is to provide a lead screw gear threading box with a selector device and gear control mechanism that superimposes at least two gear ratios upon the initially selected gear ratio.

Other objects of the invention will appear from the following description of an embodiment of the invention illustrated in the accompanying drawings.

In the drawings:

Fig. 5 is an enlarged top elevation of the control levers and dial in position; and Fig. 6 is a section similar to Fig. 5 showing the coarse and fine feed lever is opposite position.

Figure 1:
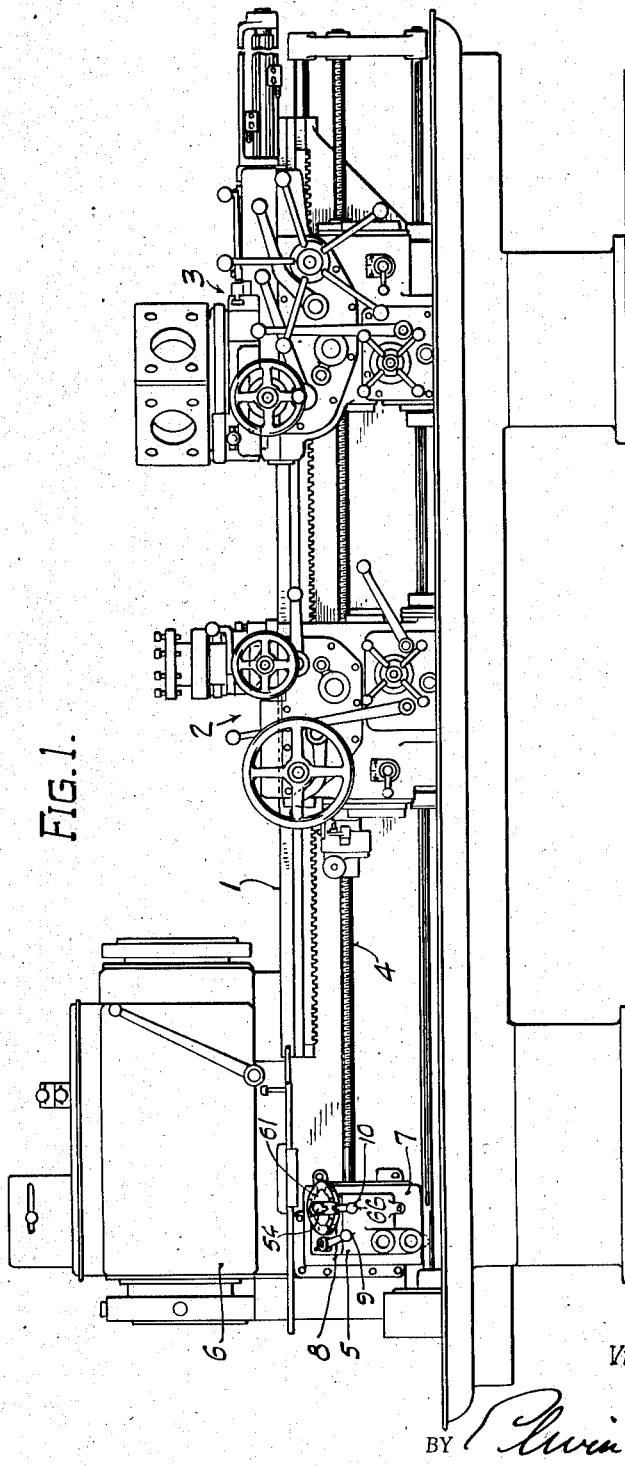
Figure 1 is a front elevation of a lathe having a thread cutting attachment.

The invention is illustrated as employed with a lathe 1, and as shown in the drawings, the tool post carriage 2 and turret carriage 3 are fed along the bed of the lathe by the lead screw 4 projecting from gear box 5 at one end of the lathe and extending through the carriages 2 and 3 to the opposite end of the lathe.

The lead screw 4 is driven from the headstock 6 through a gear transmission disposed within the gear box 5. The gear transmission of gear box 5 through its control mechanism provides the operator with a substantial number of different speeds at which lead screw 4 may be driven in either forward or reverse rotation.

In general, gear box 5 comprises a housing 7 having a number of removable end plates permitting access to the gear transmission and a top cover plate 8. The top portion of the gear box is preferably sloped slightly downwardly to provide easy access by the operator to the forward and reverse shifter lever 9 and the gear ratio selector device 10 projecting outwardly through cover plate 8. The operation of lever 9 determines the forward or reverse rotation of screw 4, and selector device 10 selects different gear ratios in the gear transmission to provide for regulation of the speed of lead screw 4.

The gear ratio change transmission illustrated in the drawings as controlled by selector device 10, comprises in general in the order of the transmission of driving force from drive gear 11 to lead screw 4, a drive shaft 12, a cone gear shaft 13, a circular rack shaft 14, a forward and reverse shaft 15, a coarse and fine feed shaft 16, and the respective gear trains connecting each shaft in driving relation. Lead screw 4 is driven in either forward or reverse rotation by the forward or reverse shaft 15 and its respective gears actuated by lever 9 and operating in conjunction with the shafts 12, 13, 14 and 16.

The drive gear 111 driven by the headstock 6 meshes with gear 17 secured to the hub of gear 18 rotatably mounted on the portion of lead screw 4 extending within gear box 5. Gear 18 drives gear 19 fixed to drive shaft 12 to rotate the same and drive cone gears 20 keyed to drive shaft 12.

Cone gears 20 mesh with a similar set of cone gears 21 rotatably mounted on cone gear shaft 13. The cone gears 21 have a longitudinal key slot in their hub portion divided by spacers 22 to provide retainer spaces for the ducking key 23 which is snapped into and held in the respective spaces by the spring 24 backing the same. A flanged slider member 25 encircling the cone gear shaft 13 is secured to the arm of ducking key 23 and serves to operate the ducking key. The slider member 25 is in turn operated by the selector device 10 as hereinafter described.

Additional cone gears 26 are keyed to the cone gear sheaft 13 and mesh with a similar set of cone gears 27 rotatably mounted on the circular rack shaft 14.

The cone gears 27 have a longitudinal key slot in the hub thereof divided by spacers 28 to provide retaining grooves for the ducking key 29 which is snapped into and held in each respective groove by spring 30 providing a backing for the key.

A circular rack 31 encircles the circular rack shaft 14. The arm of ducking key 29 is secured to the circular rack which rotates with the shaft and is movable longitudinally thereon to move the key longitudinally in the key slot in the hub of cone gears 27. Circular rack 31 is in turn moved longitudinally along shaft 14 by the gear 32 controlled by the selector device 10 as hereinafter described.

Gear 33 is fixed to circular rack shaft 14 and meshes with gear 34 rotatably mounted on forward and reverse shaft 15, and also with gear 35 having a sleeve 36 rotatably mounted on coarse and fine feed shaft 16. A gear 37 is also secured to sleeve 36 on shaft 16 and drives gear 38 rotatably mounted on forward and reverse shaft 15.

The gears 34 and 38 rotatably mounted on shaft 15 have a longitudinal key slot in their hub portion divided by spacer 39 which provides a retaining slot for each gear to receive the ducking key 40 which is held in each respective slot by spring 41 backing up the same.

A flanged slider collar 42 is disposed around forward and reverse shaft 15 and is secured to the arm of ducking key 40 to move the key longitudinally in the key slot in the hub of gears 34 and 38. Collar 42 is in turn actuated by the forward and reverse lever 9 disposed on the outside of gear box 5.

Figure 4:
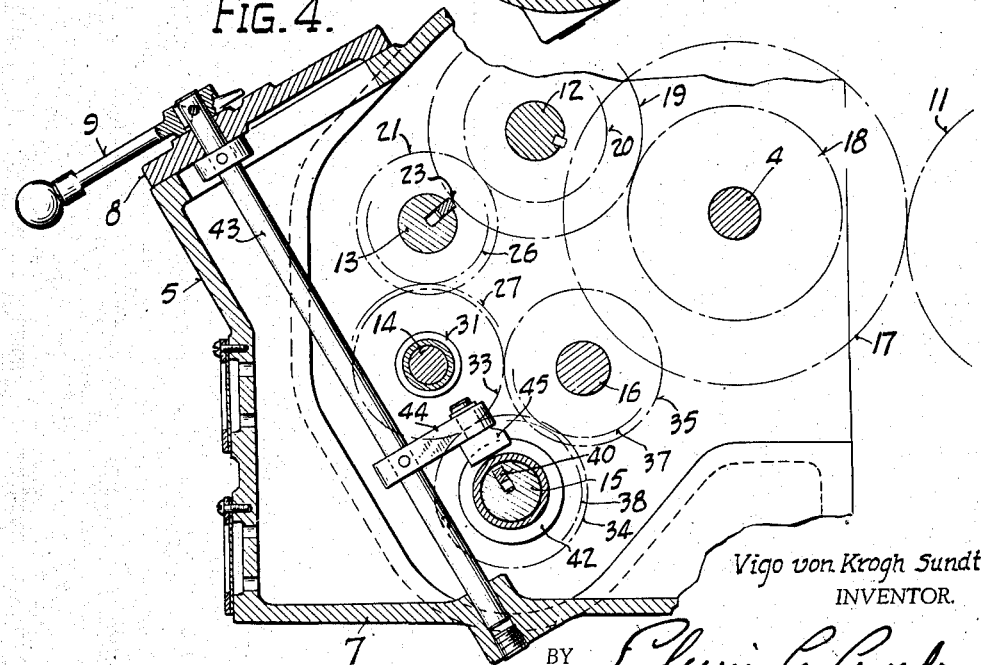
Fig. 4 is a detail section showing the forward and reverse mechanism.

The lever shaft 43 as shown in Fig. 4 projects through the top plate 8 of the gear box 5 and a stud 44 joins the shaft to dog 45 which in turn engages collar 42 between its flanges to actuate the same when lever 9 is moved to either forward or reverse as indicated on the outside of gear box 5.

With lever 9 resting at the forward indication, ducking key 40 keys gear 34 to shaft 15 to drive shaft 15 in forward rotation from gear 33. If lever 9 rests at the reverse indication, then ducking key 40 keys gear 38 to shaft 15 to drive shaft 15 in reverse rotation.

A large gear 46 is keyed to forward and reverse shaft 15 at the end opposite to gears 34 and 38. Gear 46 drives pinion 47 rotatably mounted on the coarse and fine feed shaft 16. A pinion gear 48 on shaft 15 adjacent gear 46 drives a large gear 49 rotatably mounted on shaft 16. Gears 46 and 47 constitute the coarse feed gears, and gears 48 and 49 constitute the fine feed gears.

Shaft 16 is driven selectively from gear 47 or gear 49 by means of a ducking key 50 which operates in a longitudinal key slot in the hubs of the gears divided by a spacer 51. A spring 52 holds the ducking key in the respective space.

The arm of ducking key 50 is secured to the flanged slider member 53 encircling coarse and fine feed shaft 16 and serving to move the ducking key longitudinally in the key slot in the hub of gears 47 and 49. Slider member 53 is in turn actuated by the coarse and fine feed lever 54 disposed on the outside of the gear box and forming part of selector device 10. Lever 54 rotates shaft 55 having the eccentric 56 disposed at the end entering clutch fork 57 which in turn engages the slider member 53 and moves it longitudinally either in one direction or the other, depending upon whether lever 54 is resting at the coarse or fine feed indication.

Coarse and fine feed shaft 16 is rotated either by coarse feed gear 47 or fine feed gear 49 depending upon which gear is keyed to the shaft by ducking key 50.

Gear 58 is secured at substantially the center of shaft 16 and meshes with gear 59 fixed to lead screw 4 to drive the lead screw at a substantial number of different speeds depending upon which gear ratio is established in the gear transmission by selector device 10. Lead screw 4 will be driven in either forward or reverse at the gear ratio selected by selector device 10 depending upon whether the pointer of lever 9 is pointed at the forward or reverse indication on shifter plate 60 secured on the outside of gear box 5.

Reference is now made more specifically to selector device 10 which has previously been referred to in connection with the actuating of the flanged slider member 25 on cone gear shaft 13, the circular rack 31 disposed on circular rack shaft 14, and the flanged slider member 53 encircling coarse and fine feed shaft 16.

Selector device 10 comprises a disc 61 having a dial 62 divided preferably into eight distinct parts shown as by heavy lines drawn from the outside circumference to the inside circumference of the dial. This division of the dial into eight parts conforms with the eight gears forming the cone gears 27 rotatably mounted on circular rack shaft 14.

Disc 61 is connected to the gear 32 through shaft 63 and when disc 61 is dialed to expose one of the divisions of the dial through window 64 in plate 65, gear 32 is rotated to move circular rack 31 along shaft 14 and lodge ducking key 29 in one of the retaining spaces of cone gears 27 to drive circular rack shaft 14 by the particular gear keyed thereto by the ducking key. Each particular division of dial 62 corresponds with a certain defined gear of cone gears 27 so that the operator may establish the gear ratio desired by rotating the disc 61.

Each of the eight divisions of dial 62 are again subdivided into three parts. These three parts correspond with the gear ratios provided by the three gears of cone gears 21 rotatably mounted on cone gear shaft 13 and indicate the gear ratio that may be selected by moving lever 66, loosely connected with plate 65, until the desired ratio or thread is exposed through window 64.

Lever 66 is capable of movement to the right or left only a sufficient distance to obtain any one of the threads in the subdivision of one of the parts of dial 62. Lever 66 is secured to shifting arm 67 carrying dog 68 which engages the annular groove in flanged slider member 25. Movement of lever 66 therefore actuates slider member 25 to move the ducking key 23 into engagement with one of the cone gears 21 and key the same to cone gear shaft 13 to drive the latter at the speed of the particular gear ratio established. The backing-up spring 30 of ducking key 29 locks the ducking key 29 in engagement with one of cone gears 27 while ducking key 23 is brought into engagement with any one of the three gears of cone gears 21.

The speed of shaft 13 is communicated to circular rack shaft 14 and thence through forward and reverse shaft 15 to the coarse and fine feed shaft 16 by the gear transmission previously described.

The operator, however, has a further opportunity through coarse and fine feed lever 54 of selector device 10 previously described to provide two other changes of speed in shaft 16 before the final speed of the gear transmission is communicated from shaft 16 to the lead screw 4.

Each of the three subdivided groups of gear ratios on the dial previously referred to has an inner and outer circle of thread designations with coarse threads on the outer circle and fine threads on the inner circle. When the coarse and fine feed shift lever 54 rests in the position shown in Fig. 5, connecting the coarse feed pinion 47 to shaft 16, the plate 65 containing window 64 is radially outward to expose the coarse thread reading through the window. The plate 65 is mounted eccentrically on the hub of lever 54, and when the lever is turned through 180° to its upper position, shown in Fig. 6, the plate 65 is moved radially inward to expose the fine feed reading through window 64.

The movement of eccentric lever 54 rotates shaft 55 and actuates eccentric 56 engaging clutch fork 57 to move the slider member 53 and dispose ducking key 50 in engagement with either coarse feed gear 47 or fine feed gear 49 and key one of these gears to the coarse and fine feed shaft 16 to drive the shaft at the particular coarse or fine gear ratio selected.

Selector device 10 therefore provides eight gear ratios by manipulation of disc 61 and this is multiplied into twenty-four possible gear ratios by manipulation of lever 66 in conjunction with the three subdivisions of the initial group of eight on dial 62. In turn, coarse and fine feed lever 54 multiplies the possible gear ratio to forty-eight in providing either a coarse or fine gear selection. These forty-eight gear ratios enable lead screw 4 to be driven at forty-eight different speeds from the head stock 6. These speeds are obtainable in either forward or reverse rotation of the lead screw by manipulation of the forward and reverse shifter lever 9.

The window 64 provided in plate 65 prevents a mistake in reading on the part of the operator, and the selector device 10 readily enables the operator to select any given speed desired for screw shaft 4. By having the several superimposed gear ratios function on a single dial, mistakes of adjustment are substantially eliminated. This is made possible by superimposing the several control members 61, 66 and 54, and transmitting the rotational movements thereof through shafts that are disposed concentrically, as shown.

In the drawings, shifter lever 9 is shown disposed at the forward driving designation to indicate that lead screw 4 is being driven in forward rotation. In this position the fixed gear 33 on circular rack shaft 14 is driving forward and reverse shaft 15 in forward rotation through gear 34 keyed to shaft 15 by ducking key 40.

Lever 66 is illustrated in Fig. 5 as disposed with plate 65 over the center threads of the subdivided group of three of the initial division of eight on dial 62. With lever 66 in the position illustrated, the ducking key 23 is disposed in engagement with the central gear of cone gears 21 to key the same to drive shaft 13 and drive the shaft at the speed of the particular gear ratio established.

Figure 2:
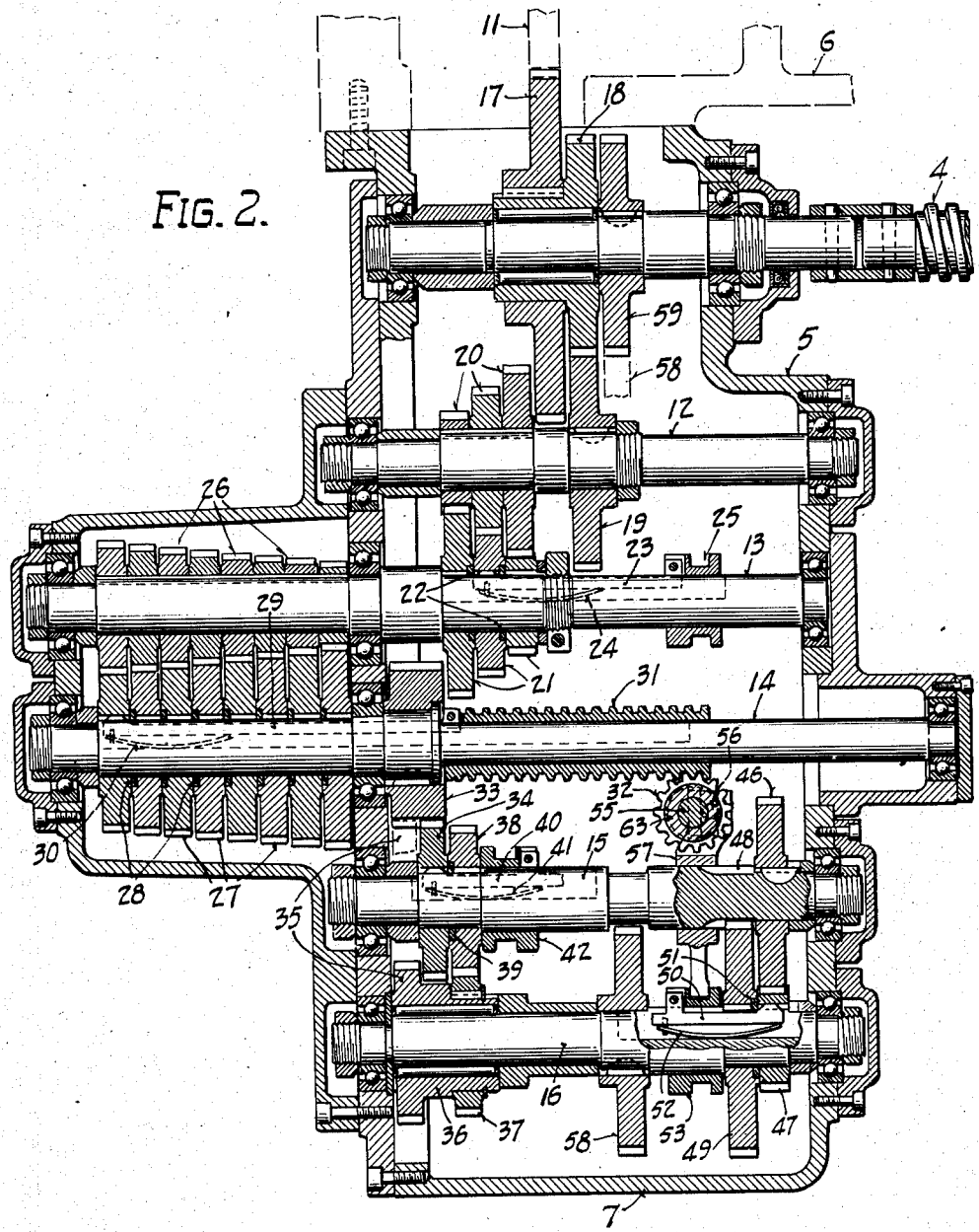
Fig. 2 is a developed section illustrating the gears and drive mechanism for the lead screw, and showing the circular rack for shifting the gears.
Figure 3:
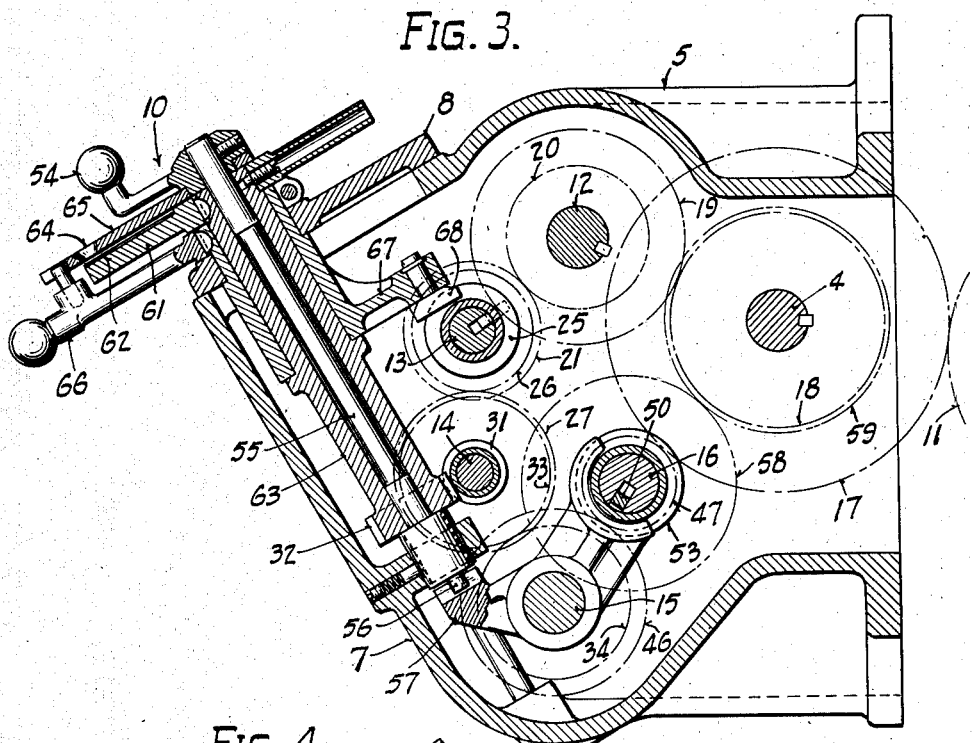
Fig. 3 is a section through the operating mechanism for the gear shift and clutches.

This gear ratio drives circular rack shaft 14 in conjunction with the gear ratio established by cone gears 26 on drive shaft 13 and cone gears 27 on circular rack shaft 14. With the disc 61 exposing a given number on the dial 62 through window 64, the ducking key 29 employed with circular rack shaft 14 is shown disposed in engagement with the first gear of cone gear 27 idling on shaft 14, looking from left to right in Fig. 2, to key the same to circular rack shaft 14 and drive the shaft at the gear ratio established.

With window 64 exposing the coarse thread on the outer circle of the dial, as shown in Fig. 5, lever 54 is down and disposes ducking key 50 in engagement with coarse feed gear 47 to key the same to coarse and fine feed shaft 16 and drive the latter at the gear ratio thus established.

By means of gear 58 fixed on shaft 16 and geared to gear 59 fixed to lead screw 4, the gear ratio established by the selector device 10 as illustrated and described is communicated to the lead screw to drive the latter at the desired speed as indicated on the dial.

Should a fine feed be desired, the lever 54 is rotated through 180° to its upper position as shown in Fig. 6, thereby operating ducking key 50 to connect the fine feed gear 49 to shaft 16. In this position of lever 54 the window 64 is moved upwardly to provide reading of the inner circle of numbers indicating the various fine feeds to be selected.

The gear threading box of the invention is an improvement over previous gear boxes beause of the substantial large number of speeds that it provides for the lead screw. These speeds are obtainable through a simple selector device that is easily manipulated by the operator.

Various embodiments of the invention may be employed within the scope of the accompanying claims.

The invention is claimed as follows:

1. In a device of the class described having a plurality of separate change speed devices providing at least two selective speed ratios superimposed upon one another, a rotary member for selecting one of said speed ratios and having an axially facing circular indicating dial thereon, and a rotary lever for selecting each remaining speed ratio superimposed upon said rotary member, and the dial of said rotary member indicating a single over-all selected speed ratio for the device without movement thereof after movement of the rotary lever to superimpose a remaining speed ratio on said rotary member.

2. In a device for selecting superimposed driving speed ratios, a rotary member for selecting a primary speed ratio, an axially facing circular indicating dial on said rotary member and having designations for the different possible driving speed ratios, a movable window member overlying said dial and indicating a single selected driving speed ratio, and a rotary lever for selecting a secondary speed ratio to be superimposed upon the primary speed ratio in providing the over-all driving speed ratio, said rotary lever operating said window to move the same relative to said dial and indicate the driving speed ratio selected.

3. In a device for selecting superimposed driving speed ratios having a plurality of different speed ratio change mechanisms, a plurality of concentric shafts disposed to operate the respective speed ratio change mechanisms, a rotary member secured to each shaft to operate the same, an axially facing dial having a plurality of rows of circularly arranged designations for the several over-all driving speed ratios to be selected, a window for indicating the selected driving speed ratio on said dial, and means operable by the several rotary members for moving said window in respectively selected radial and circumferential directions relative to said dial to effect the final indication of the driving speed ratio selected.

4. In a device for selecting superimposed driving speed ratios having at least two different speed ratio change mechanisms, a rotary member for operating each mechanism, a substantially flat dial disposed on one of said rotary members to rotate therewith and having an inner and an outer circle of designations for different over-all driving speed ratios from which selection is to be made, a window disposed on the face of said dial at the radial location of one of said circles of designations to uncover the designation for the speed ratio corresponding to the position of the rotary member carrying said dial, and an eccentric on said other named rotary member to move said window to the respective circle of designations corresponding with the speed ratio selected by said rotary member and superimposed upon the speed ratio selected by said rotary member carrying the dial.

5. In a device of the class described having three sets of change speed devices selectively operable in series, separate rotary members operating on a common axis for selecting any speed ratio of each of said sets to be superimposed upon those of the others, a substantially flat dial carried by one of said rotary members and having different circles of designations of over-all driving speed ratios, said dial being divided into primary sections circumferentially each containing a plurality of secondary sections circumferentially, a window eccentrically mounted on a second of said rotary members to move radially of said dial and thereby indicate designations from different circles of designations on said dial, and means connecting said window to said third rotary member to effect limited rotary movement between the window and dial within the boundaries of a primary section of the dial and in addition to the primary rotary movement provided therebetween by rotation of the member carrying said dial.

6. In a device of the class described having a change speed transmission with a housing therefor and an opening through the front wall of the housing facing the operator, a pair of concentric rotary control members extending axially through said opening, means secured to the outer ends of said members for manually rotating the same independently of each other, a circular substantially flat dial on one of said members with a plurality of rows of circularly arranged indicating designations, and a pointer eccentrically mounted on the other of said members for indicating different rows of designations on said dial dependent upon the rotary position of said last mentioned control member.

7. In a device of the class described having a change speed transmission with a housing therefor and an opening through the front wall of the housing facing the operator, three concentric rotary control members extending axially through said opening, separate means secured to the outer end of each of said members for manually rotating the same, a circular substantially flat dial mounted on one of said members to rotate therewith and having two rows of circularly arranged indicating designations, a window eccentrically mounted on another of said members to be moved radially from one row of designations to another on the face of said dial upon partial rotation of said member, and means connecting said window to the third control member to effect limited circumferential movement of the window upon said dial when said member is rotated.

VIGO von KROGH SUNDT.